(12) United States Patent
Numata

(10) Patent No.: US 11,933,438 B2
(45) Date of Patent: Mar. 19, 2024

(54) HOSE ATTACHMENT STRUCTURE AND GROUND CLIP

(71) Applicant: TOYOX CO., LTD., Toyama (JP)

(72) Inventor: Kenichi Numata, Toyama (JP)

(73) Assignee: TOYOX CO., LTD., Toyama (JP)

( * ) Notice: Subject to any disclaimer, the term of this patent is extended or adjusted under 35 U.S.C. 154(b) by 104 days.

(21) Appl. No.: 17/782,382

(22) PCT Filed: Oct. 5, 2020

(86) PCT No.: PCT/JP2020/037730
§ 371 (c)(1),
(2) Date: Jun. 3, 2022

(87) PCT Pub. No.: WO2021/131221
PCT Pub. Date: Jul. 1, 2021

(65) Prior Publication Data
US 2023/0011828 A1    Jan. 12, 2023

(30) Foreign Application Priority Data
Dec. 23, 2019    (JP) .................................. 2019-231493

(51) Int. Cl.
*F16L 33/03*    (2006.01)
*F16B 2/24*    (2006.01)
*F16L 11/127*    (2006.01)

(52) U.S. Cl.
CPC ................ *F16L 33/03* (2013.01); *F16B 2/24* (2013.01); *F16L 11/127* (2013.01)

(58) Field of Classification Search
CPC .......... F16L 33/03; F16L 1/127; Y10T 24/149
See application file for complete search history.

(56) References Cited

U.S. PATENT DOCUMENTS

| 197,716 A | * | 12/1877 | Caldwell | ................ | B65D 63/12 |
| | | | | | 285/242 |
| 1,700,043 A | * | 1/1929 | Gunn | .................... | F16L 33/021 |
| | | | | | 81/9.3 |

(Continued)

FOREIGN PATENT DOCUMENTS

| CN | 204942841 | 1/2016 |
| JP | 49-30773 | 3/1974 |

(Continued)

OTHER PUBLICATIONS

International Search Report issued in International Patent Application No. PCT/JP2020/037730, dated Dec. 1, 2020, along with an English translation thereof.

(Continued)

*Primary Examiner* — Robert Sandy
(74) *Attorney, Agent, or Firm* — Greenblum & Bernstein, P.L.C.

(57) ABSTRACT

An operator is enabled to easily identify the normal attachment direction of a ground clip and set the ground clip in a correct direction.
Provided is a hose attachment structure in which a ground clip is attached over a grounded electroconductive pipe and a flexible hose inserted onto an outer face of the electroconductive pipe, wherein the ground clip includes a coil part that is attached to the outer face of the electroconductive pipe and an outer peripheral surface of the flexible hose and a pair of pinch parts that protrudes from both end parts in an axial direction of the coil part and faces each other, and one pinch part among the pair of pinch parts has an asymmetrically-shaped indicator part having directivity in the axial direction of the coil part.

5 Claims, 6 Drawing Sheets

(56) References Cited

U.S. PATENT DOCUMENTS

| | | | | |
|---|---|---|---|---|
| 3,805,337 | A | * | 4/1974 | Branstetter ............. F16L 33/03 24/27 |
| 4,127,921 | A | * | 12/1978 | Townsend ............... F16L 33/03 24/456 |
| 2006/0131875 | A1 | * | 6/2006 | Zielinski ............... D06F 39/083 285/242 |

FOREIGN PATENT DOCUMENTS

| | | |
|---|---|---|
| JP | 56-122890 | 9/1981 |
| JP | 2002-5372 | 1/2002 |
| JP | 3690790 | 8/2005 |
| JP | 2011-121521 | 6/2011 |
| JP | 2013-36503 | 2/2013 |
| JP | 2015-102192 | 6/2015 |
| WO | 2008/080914 | 7/2008 |
| WO | 2013/018542 | 2/2013 |

OTHER PUBLICATIONS

Brochure by TOYOX Co., Ltd, "For Food Grade Piping of Powder and Granular Materials/Seasonings," dated Jul. 1, 2019, along with a corresponding English brochure.

International Preliminary Report on Patentability issued in International Patent Application No. PCT/JP2020/037730, dated Apr. 30, 2021, along with an English translation thereof.

Written Opinion issued in International Patent Application No. PCT/JP2020/037730, dated Dec. 1, 2020, along with an English translation thereof.

Extended European Search Report Issued in Corresponding EP Patent Application No. 20904293.6, dated. Nov. 23, 2023.

Office Action issued in Corresponding Indonesian Patent Application No. P00202206615, dated Dec. 20, 2023, along with an English translation thereof.

* cited by examiner

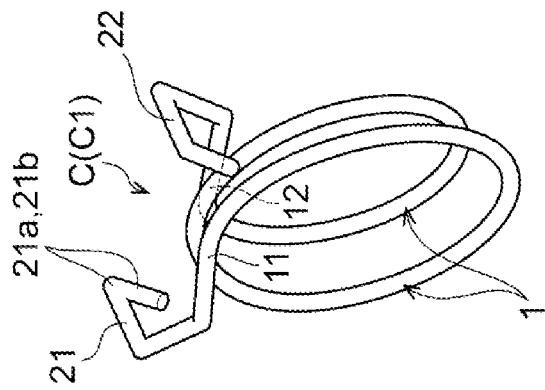
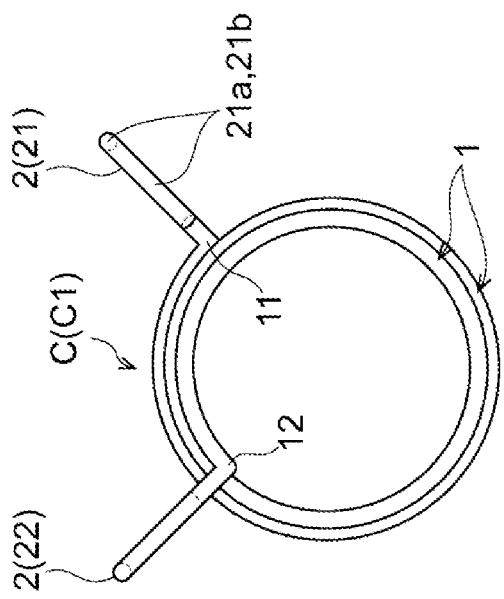
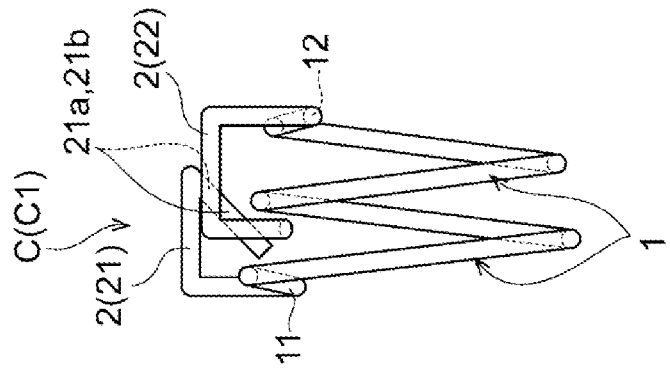

US 11,933,438 B2

HOSE ATTACHMENT STRUCTURE AND GROUND CLIP

TECHNICAL FIELD

The present invention relates to a hose attachment structure used to discharge electrostatic generated in a flexible hose such as a hose and a tube, and a ground clip used in the hose attachment structure.

BACKGROUND ART

Conventionally, as a hose attachment structure and a ground clip of this type, a hose connection structure, in which a hose having an electroconductive wire exposed on a hose surface is fitted into a grounded metallic pipe and in which a grounding member is fitted into a connection part between the metallic pipe and the hose and brought into contact with the metallic pipe and the electroconductive wire on the surface of the hose, has been known (see, for example, PTL 1).

The grounding member has a coil part composed of a metal wire rod and a pair of pinch parts and is configured so that the inner diameter of the coil part is expanded by the pinching operation of the pinch parts and restored by the release operation of the pinch parts due to the elastic forces of the pinch parts.

As a method for attaching the grounding member, the grounding member is fitted in advance into the side of the metallic pipe, and the grounding member is rotated in the same direction as the spiral direction of a spiral-shaped reinforcing member provided on the hose, while the diameter of the coil part is expanded by the pinching operation of the pinch parts after the hose is fitted into the metallic pipe. When the pinch parts are released in a state in which a part of the coil part is brought into contact with the metallic pipe along with the rotation, the hose and the metallic pipe are fastened. By the fastening, the coil part is held in contact with both the electroconductive wire of the hose and the metallic pipe, and the electroconductive wire of the hose is electrically connected to the metallic pipe through the coil part. Therefore, even if electrostatic is produced in the hose, the electrostatic is discharged from the electroconductive wire to the metallic pipe through the coil part.

In addition, the inner diameter of the coil part is expanded from the side of the metallic pipe toward the side of the hose, whereby it is possible to securely attach the grounding member even if the hose is thick.

CITATION LIST

Patent Literature

[PTL 1] Japanese Patent Application Laid-open No. 2002-005372

SUMMARY OF INVENTION

Technical Problem

As for the setting of the grounding member of PTL 1, an operator is required to correctly set the grounding member, with the diameter-expanded hose side of the coil part being directed to the hose.

However, when the pair of pinch parts has the same shape, since the inner diameter of the coil part is only slightly different between the metallic pipe side and the hose side in the grounding member of PTL 1, an operator has a difficulty in easily recognizing a direction with respect to the metallic pipe and the hose. Thus, there is a fear that the operator falsely sets the grounding member retrorsely.

If the operator falsely sets the grounding member retrorsely, the large-diameter hose side of the coil part faces the metallic pipe in a radial direction. Therefore, the grounding member cannot contact the outer face of the metallic pipe and is put in a floating state. As a result, there is a problem that the grounding member is not electrically connected and cannot perform discharge.

In addition, if the operator forcibly attaches the coil part to the reinforcing member of the hose retrorsely, each of the coil part strongly contacts a site (valley parts) of the spiral-shaped reinforcing member. Therefore, there is a concern that the coil part twists and deforms due to the friction. Besides, if the coil part runs on (mountain parts of) the reinforcing member and excessively deforms, with the diameter being expanded, there is a concern that the coil part deforms, the hose is damaged, or the hose deforms. As a result, there is a problem that the coil part or the hose is easily broken.

Solution to Problem

In order to solve the above problems, a hose attachment structure according to the present invention is a hose attachment structure in which a ground clip is attached over a grounded electroconductive pipe and a flexible hose inserted onto an outer face of the electroconductive pipe, wherein the ground clip includes a coil part that is attached to the outer face of the electroconductive pipe and an outer peripheral surface of the flexible hose and a pair of pinch parts that protrudes from both end parts in an axial direction of the coil part and faces each other, and one pinch part among the pair of pinch parts has an asymmetrically-shaped indicator part having directivity in the axial direction of the coil part.

Further, in order to solve the above problems, a ground clip according to the present invention is a ground clip attached over a grounded electroconductive pipe and a flexible hose inserted onto an outer face of the electroconductive pipe, the ground clip including: a coil part that is attached to the outer face of the electroconductive pipe and an outer peripheral surface of the flexible hose; and a pair of pinch parts that protrudes from both end parts in an axial direction of the coil part and faces each other, wherein one pinch part among the pair of pinch parts has an asymmetrically-shaped indicator part having directivity in the axial direction of the coil part.

BRIEF DESCRIPTION OF DRAWINGS

FIGS. 2(a) to 2(c) are explanatory views showing the entire configuration of a ground clip according to the embodiment of the present invention, FIG. 2(a) being an enlarged front view, FIG. 2(b) being an enlarged side view, FIG. 2(c) being a perspective view.

DESCRIPTION OF EMBODIMENTS

Hereinafter, an embodiment of the present invention will be described in detail on the basis of the drawings.

As shown in FIG. 1 to FIG. 6, the present invention relates to a hose attachment structure D in which a ground clip C is attached over an electroconductive pipe A and a flexible hose B, and the ground clip C used in the hose attachment structure D.

The hose attachment structure D and the ground clip C are provided to discharge electrostatic produced when food particulates or powder such as wheats, soybeans, and seasonings, particulates or powder in other fields, or the like are transported through pipes.

The electroconductive pipe A is a non-deformable pipe body such as a metallic pipe made of a conductive material and attached so that its outer face A1 is exposed to a facility A2 such as a manufacturing machine. The electroconductive pipe A is in a grounded state when the facility A2 is grounded.

The flexible hose B is provided with, at least at a part of its outer peripheral surface, an electric conductor made of a conductive material having flexibility. The flexible hose B includes a hose main body B1 having flexibility and a conductor B2 provided on the outer surface of the hose main body B1 so as to be exposed as its main constituting elements. In addition, the flexible hose B preferably includes a reinforcing member B3 spirally protruded along the outer surface of the hose main body B1 and the outer surface of the conductor B2.

The conductor B2 is disposed in a linear shape, a spiral shape, or the like in an axial direction along the outer surface of the hose main body B1. At parts other than the reinforcing member B3 on the outer peripheral surface of the flexible hose B, the outer surface of the hose main body B1 and the outer surface of the conductor B2 are exposed.

The inner diameter of a connection side end part B1a inserted into at least the electroconductive pipe A in the hose main body B1 is set to be substantially the same as or slightly smaller than the outer diameter of the electroconductive pipe A, and the connection side end part B1a is preferably inserted into the electroconductive pipe A with its diameter slightly expanded.

Figure 1:
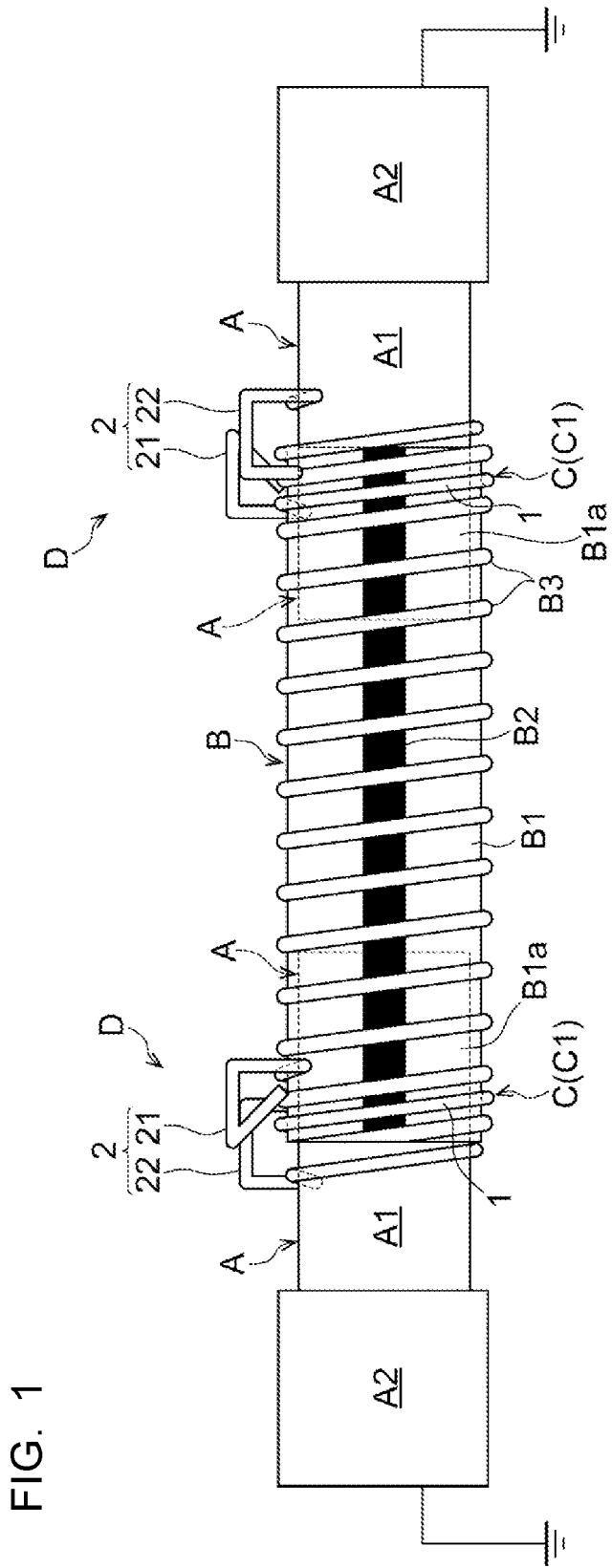
FIG. 1 is an explanatory view showing the entire configuration of a hose attachment structure according to an embodiment of the present invention and is a front view of a pipe connection state.

In a case shown in FIG. 1 as a specific example of the hose attachment structure D, two grounded electroconductive pipes A are provided so as to correspond to both ends of the flexible hose B. Both connection side end parts B1a of the flexible hose B are inserted and connected into the two electroconductive pipes A, respectively, whereby grounding processing is performed for each of hose connection parts.

Further, although not shown as other examples, modifications such as performing wire-bonding of the two electroconductive pipes A directly or indirectly, grounding an electric insulating pipe in a case where a plurality of the flexible hoses B are connected in series to each other with the electric insulating pipe held therebetween, and performing wire-bonding in a case where one end part of the flexible hose B is connected to the electroconductive pipe A with an electric insulating pipe held therebetween are possible. Thus, grounding processing is performed for each of hose connection parts in all the cases.

In a case shown in FIG. 1 to FIG. 6 as a specific example of the flexible hose B, the conductor B2 is formed so as to be exposed as a band-shaped layer having a predetermined width extending in the axial direction of the hose main body B1.

In addition, an electroconductive wire (not shown) is preferably held in a spiral shape between the outer surface of the conductor B2 and the reinforcing member B3 and disposed with its surface pressure-bonded to the outer surface of the conductor B2 where necessary.

Further, although not shown as other examples, modifications such as changing the shape of the conductor B2 to a linear shape or the like and disposing a plurality of the conductors B2 at predetermined intervals in a circumferential direction as described in Japanese Patent Application Laid-open No. 2002-005372 are possible.

The ground clip C according to the embodiment of the present invention is configured by bending processing or the like of a conductive wire rod such as an elastically-deformable metal wire.

Specifically, the ground clip C includes a coil part 1 that is attached to the outer face A1 of the electroconductive pipe A and the outer peripheral surface of the flexible hose B and a pair of pinch parts 2 that radially protrudes in a radial direction from both end parts 11 and 12 in the axial direction of the coil part 1 and faces each other in a circumferential direction as its main constituting elements.

The ground clip C is configured so that the coil part 1 elastically deforms with its diameter expanded according to a "pinching operation" in which the pair of pinch parts 2 is pinched and caused to relatively move close to each other in the circumferential direction. The ground clip C is configured so that the coil part 1 elastically deforms with the diameter reduced according to a "release operation" in which the pinching operation of the pair of pinch parts 2 with the diameter expanded is loosened to cause the pinch parts 2 to relatively move away from each other in the circumferential direction.

The coil part 1 is attached so as to wind along the outer peripheral surface of the flexible hose B and configured so as to fasten a predetermined spot in the axial direction of the flexible hose B in the radial direction.

Specifically, the size of the coil part 1 is set so that the coil part 1 becomes movable in the axial direction along the outer peripheral surface of the flexible hose B through diameter-expanded deformation according to the "pinching operation" and fastens the flexible hose B in the radial direction through diameter-reduced deformation according to the "release operation."

In a case shown in FIG. 1 to FIG. 6, the flexible hose B includes the spirally-protruding reinforcing member B3. Therefore, when the coil part 1 is threadedly engaged with site (valley parts) of the reinforcing member B3, the coil part 1 is disposed so as not to deviate in the axial direction of the flexible hose B.

Further, although not shown as another example, the attachment of the coil part 1 to the flexible hose B that does not include the reinforcing member B3 and has a smooth (flat) outer peripheral surface is also possible.

In addition, the coil part 1 is preferably formed into a conical shape in which the diameter is gradually expanded from an opening part on the side of the electroconductive pipe A toward an opening part on the side of the flexible hose B as shown in FIG. 1 to FIG. 6. In this case, an inner diameter on a one-end opening side facing the flexible hose B in the radial direction is larger than an inner diameter on the other-end opening side facing the electroconductive pipe A in the radial direction in the coil part 1.

At a one end part 11 facing the flexible hose B and the other end part 12 facing the electroconductive pipe A in the coil part 1, the pair of pinch parts 2 is radially and continuously formed in the radial direction of the coil part 1, respectively.

That is, one pinch part 21 is disposed to be continuous with one of the one end part 11 or the other end part 12 of the coil part 1, and the other pinch part 22 is disposed to be continuous with the other of the one end part 11 or the other end part 12.

As shown in the figures, the one pinch part 21 and the other pinch part 22 are preferably bent and integrally formed like the bending processing of the coil part 1 made of a conductive wire rod.

The one pinch part 21 among the pair of pinch parts 2 has an indicator part 21a having directivity in the axial direction of the coil part 1. The indicator part 21a is a mark for alerting an operator to the attachment direction of the ground clip C to the electroconductive pipe A or the flexible hose B and formed into an asymmetrical shape in the axial direction of the coil part 1.

On the other hand, the other pinch part 22 does not have the indicator part 21a and is configured to have a structure different from that of the one pinch part 21 such as a structure formed into a symmetrical shape in the axial direction of the coil part 1.

In a case shown in FIG. 1 to FIG. 6 as a disposing example of the indicator part 21a, the one pinch part 21 having the indicator part 21a is disposed to be continuous with the one end part 11 on a large-diameter side facing the flexible hose B, while the other pinch part 22 that does not have the indicator part 21a is disposed to be continuous with the other end part 12 on a small-diameter side facing the electroconductive pipe A in the coil part 1.

Thus, the one pinch part 21 having the indicator part 21a and the other pinch part 22 that does not have the indicator part 21a are in an asymmetrical relationship. Therefore, the one pinch part 21 and the other pinch part 22 provide not only different appearances but also different feels with fingertips during their "pinching operation." On the basis of these differences, an operator is aware of and recognizes the indicator part 21a and identifies the one pinch part 21 from the other pinch part 22. In addition, the operator is enabled to recognize the direction of the coil part 1 through the indicator part 21a having the asymmetrical shape in the axial direction.

Particularly, the indicator part 21a is preferably formed by bending processing prior to and/or subsequent to the bending of the one pinch part 21.

In addition, the indicator part 21a preferably has a sharp point part 21b protruding in the axial direction of the coil part 1. The sharp point part 21b is configured as a sharpened shape or the like so that directivity in the axial direction of the coil part 1 becomes easily recognizable through its appearance, fingertip feels, or the like.

In a case shown in FIG. 1, FIGS. 2(a) to 2(c), and FIGS. 6(a) to 6(c) as an example (first embodiment) of the ground clip C, the one pinch part 21 is bent into a substantially V shape and formed into a triangular shape entirely. Thus, the indicator part 21a and the sharp point part 21b are integrally molded in the one pinch part 21. The other pinch part 22 is bent into a substantially U shape and formed into a rectangular shape entirely.

Figure 3:
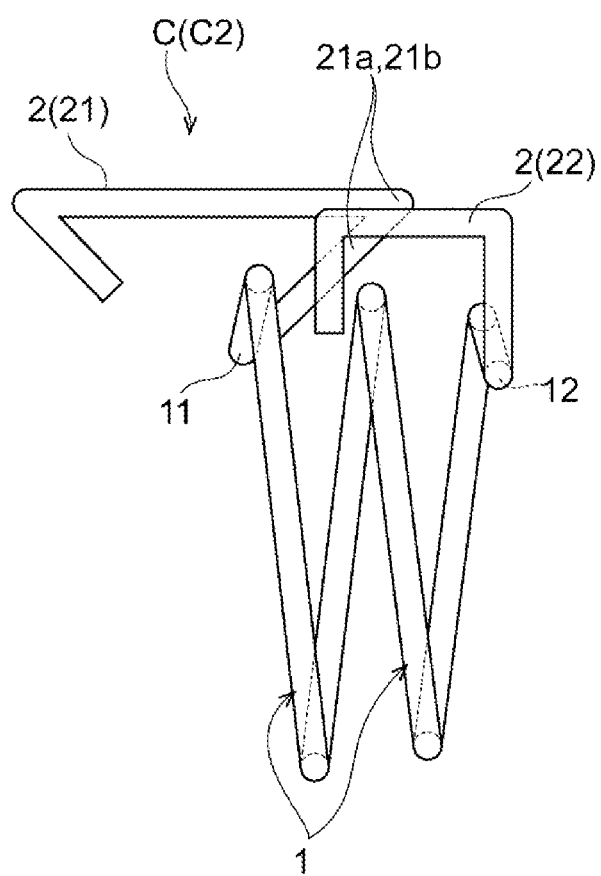
FIG. 3 is an enlarged front view showing a modified example of the ground clip according to the embodiment of the present invention.

In a case shown in FIG. 3 as another example (second embodiment) of the ground clip C, the one pinch part 21 is bent into a substantially sideways V shape and formed into a triangular shape entirely. Thus, the indicator part 21a and the sharp point part 21b are integrally molded in the one pinch part 21. The other pinch part 22 is bent into a substantially U shape and formed into a rectangular shape entirely.

Figure 4:
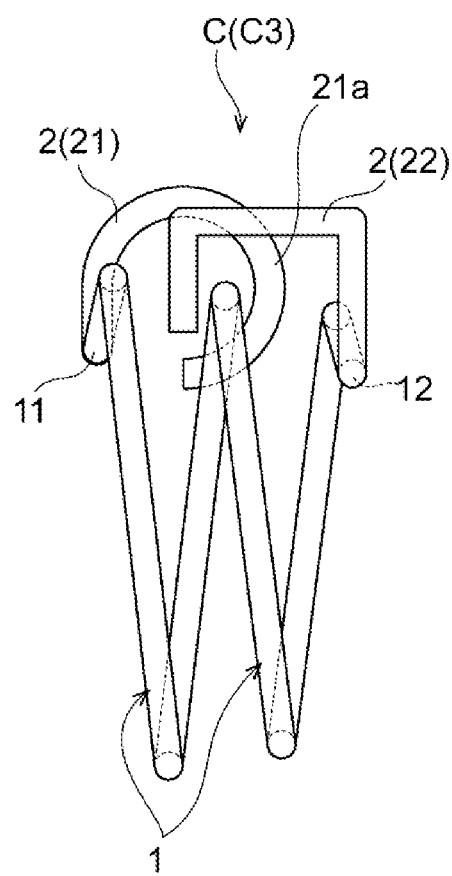
FIG. 4 is an enlarged front view showing a modified example of the ground clip according to the embodiment of the present invention.

In a case shown in FIG. 4 as another example (third embodiment) of the ground clip C, the one pinch part 21 is bent into an annular shape and formed into a substantially circular shape entirely. Thus, the indicator part 21a is integrally molded in the one pinch part 21. The other pinch part 22 is bent into a substantially U shape and formed into a rectangular shape entirely.

Figure 5:
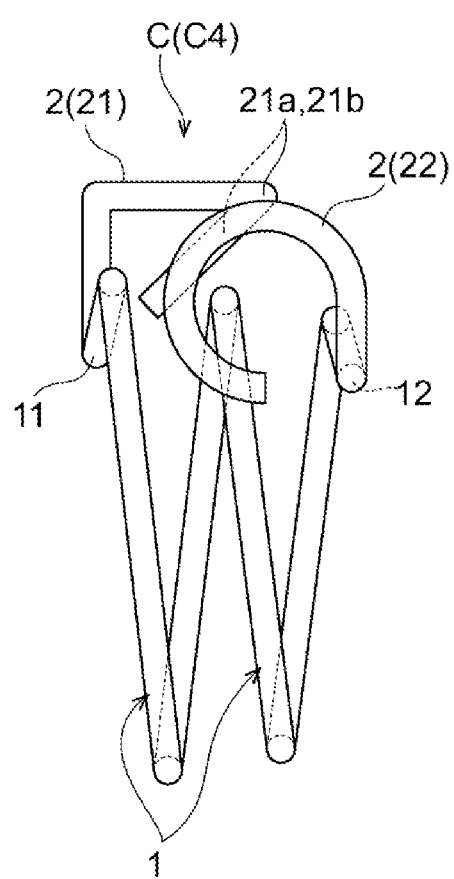
FIG. 5 is an enlarged front view showing a modified example of the ground clip according to the embodiment of the present invention.

In a case shown in FIG. 5 as another example (fourth embodiment) of the ground clip C, the one pinch part 21 is bent into a substantially V shape and formed into a triangular shape entirely. Thus, the indicator part 21a and the sharp point part 21b are integrally molded in the one pinch part 21. The other pinch part 22 is bent into an annular shape and formed into a substantially circular shape entirely.

In addition, in the cases of the illustrated examples, the tip part of the one pinch part 21 radially further protrudes in the radial direction of the coil part 1 than the tip part of the other pinch part 22, and this configuration is common.

Thus, in the cases of the illustrated examples, the one pinch part 21 has the indicator part 21a and the sharp point part 21b but is disposed to face the other pinch part 22 in the circumferential direction of the coil part 1, which smoothens the "pinching operation" to cause the one pinch part 21 and the other pinch part 22 to relatively move close to each other and provides excellent operability.

Particularly, in the cases shown in FIG. 1, FIGS. 2(a) to 2(c), and FIGS. 6(a) to 6(c), and FIG. 5, the one pinch part 21 has the sharp point part 21b formed into a sharpened shape like an acute angle shape and therefore provides excellent directivity in the axial direction of the coil part 1. In addition, the one pinch part 21 ensures a large area facing in the circumferential direction of the coil part 1 with respect to the other pinch part 22 and therefore provides excellent stability in the "pinching operation."

In the case shown in FIG. 3, the substantially sideways V shaped indicator part 21a and the sharp point part 21b formed at the one pinch part 21 are settable to be larger in the axial direction of the coil part 1 than the other pinch part 22 and therefore provide excellent directivity in the axial direction of the coil part 1 without reducing stability in the "pinching operation."

Further, although not shown as other modified examples of the ground clip C, modifications such as bending the one pinch part 21 into shapes other than those of the illustrated examples as the indicator part 21a and the sharp point part 21b and bending the other pinch part 22 into shapes other than a U shape and an annular shape are possible. In addition, modifications such as making the tip part of the one pinch part 21 and the tip part of the other pinch part 22 similarly protrude in the radial direction of the coil part 1 and making the tip part of the other pinch part 22 radially further protrude in the radial direction of the coil part 1 than the tip part of the one pinch part 21 are also possible.

Note that the indicator part 21a and the sharp point part 21b of the one pinch part 21 are not limited to those formed by bending processing in the illustrated examples but may be formed into a shape asymmetrical in the axial direction of the coil part 1 by secondary processing using other members such as the fixation of another part to the one pinch part 21 and the coating of the one pinch part 21 with paint.

Further, the operation procedure of the hose attachment structure D using the ground clip C according to the embodiment of the present invention will be described.

Figure 6:
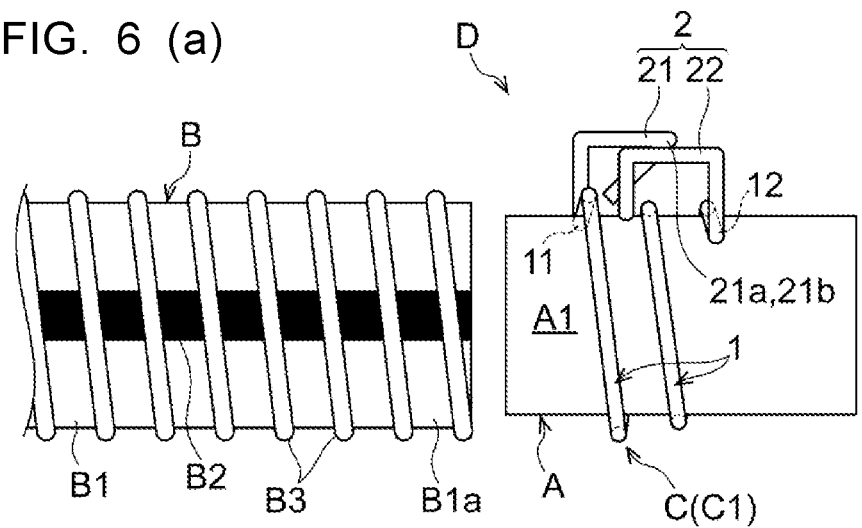
FIGS. 6(a) to 6(c) are explanatory view showing a method for attaching the ground clip, FIG. 6(a) being a front view in a case where the clip is attached to an electroconductive pipe, FIG. 6(b) being a front view in a case where a hose is inserted into the electroconductive pipe, FIG. 6(c) being a front view in a case where the clip is rotated.
Figure 6:
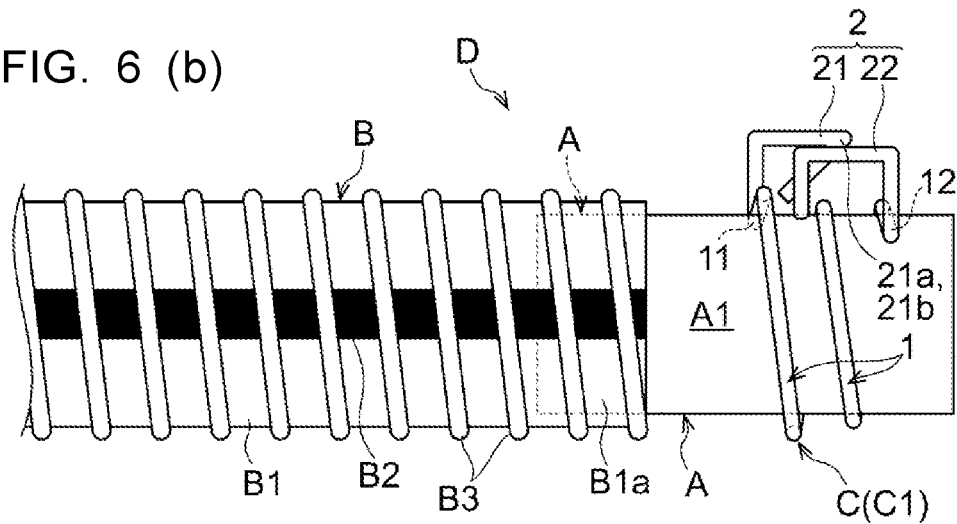
Figure 6:
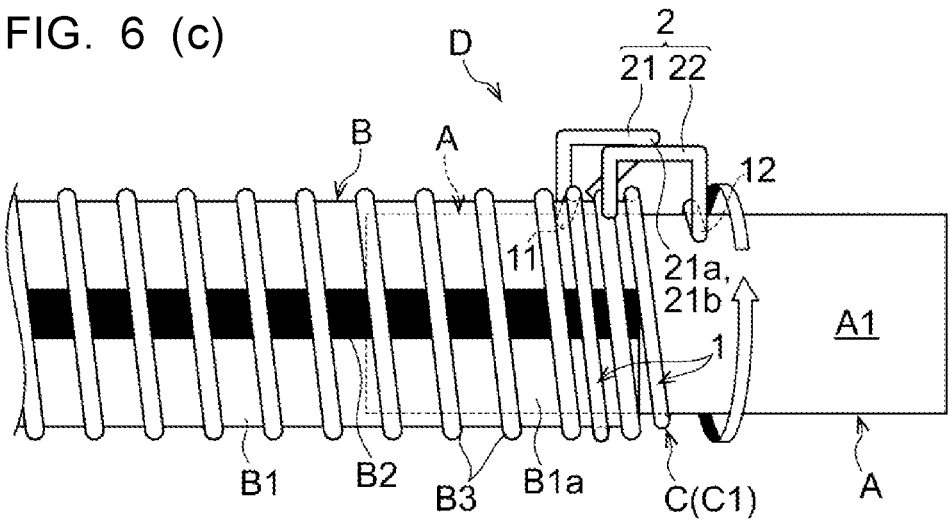

As shown in FIGS. 6(*a*) to 6(*c*) as the hose attachment structure D shown in FIG. 1, an operating procedure for connecting one end (the connection side end part B1*a* on the right side in FIG. 1) of the flexible hose B to one of the electroconductive pipes A (the electroconductive pipe A on the right side in FIG. 1) will be first described.

First, the coil part 1 is deformed by the "pinching operation" of the pair of pinch parts 2 of the ground clip C with its diameter expanded and tentatively fastened after passing through the electroconductive pipe A as shown in FIG. 6(*a*). At this time, the coil part 1 is required to be disposed so that its opening part side having a large diameter is directed toward the flexible hose B.

Therefore, in the case of the illustrated example, the coil part 1 passes through the electroconductive pipe A, with the side of the one pinch part 21 and the indicator part 21*a* disposed to be continuous with the one end part 11 on the large-diameter side being directed toward the flexible hose B. Conversely, the side of the other pinch part 22 disposed to be continuous with the other end part 12 on the small-diameter side of the coil part 1 is directed toward the electroconductive pipe A.

Next, as shown in FIG. 6(*b*), the one end (the connection side end part B1*a* on the right side in FIG. 1) of the flexible hose B is inserted into one of the electroconductive pipes A (the electroconductive pipe A on the right side in FIG. 1).

Finally, as shown in FIG. 6(*c*), the coil part 1 is moved toward the flexible hose B, while being deformed by the "pinching operation" of the pair of pinch parts 2 with the diameter expanded. After rotating by about one or one-and-half turn in the circumferential direction so as to be along the reinforcing member B3 spirally protruding from the flexible hose B, the coil part 1 is subjected to the "release operation."

By the "release operation," the one end part 11 on the large-diameter side of the coil part 1 is elastically brought into intimate contact with the outer surface of the conductor B2 of the flexible hose B, while the other end part 12 on the small-diameter side of the coil part 1 is elastically brought into intimate contact with the outer face A1 of the electroconductive pipe A. Although not shown, the flexible hose B is preferably prevented from coming off the electroconductive pipe A by a fastening tool composed of a spiral-shaped wire band or the like where necessary.

Subsequently, as for an operating procedure for connecting the other end (the connection side end part B1*a* on the left side in FIG. 1) of the flexible hose B to the other of the electroconductive pipes A (the electroconductive pipe A on the left side in FIG. 1), the operations described above are performed again with the ground clip C directed in an opposite direction.

After completing a series of the operations, a determination is made as to whether the outer peripheral surface (the conductor B2) of the flexible hose B and the outer faces A1 of the electroconductive pipes A are in a conduction state, and then the operation is completed.

In the hose attachment structure D and the ground clip C according to the embodiment of the present invention described above, the one pinch part 21 and the other pinch part 22 are in an asymmetrical relationship depending on the presence or absence of the indicator part 21*a*. Thus, an operator is enabled to identify the one pinch part 21 and the indicator part 21*a* from the other pinch part 22 and easily recognizes the direction of the coil part 1 through the indicator part 21*a* having an asymmetrical shape in the axial direction.

Thus, the operator is enabled to dispose the side of the one pinch part 21 toward the flexible hose B or the electroconductive pipe A after recognizing the side of the one pinch part 21 having the indicator part 21*a*.

Accordingly, the operator is enabled to easily identify the normal attachment direction of the ground clip C and set the ground clip C in a correct direction.

As a result, compared with a conventional type in which a pair of pinch parts has the same shape and the direction of a coil part is not easily recognized, even an operator with a less operating experience is enabled to perform electrical connection between the electroconductive pipe A and the flexible hose B through the ground clip C without making a mistake.

Thus, an explosion or the occurrence of fire due to discharge of electrostatic under a combustible atmosphere can be reliably prevented. In addition, the breakage of the coil part 1 or the flexible hose B caused when an operator forcibly attaches the coil part 1 retrorsely can be prevented.

Particularly, the indicator part 21*a* is preferably formed by bending processing.

In this case, the formation of the indicator part 21*a* can be easily made by continuous bending processing prior to and/or subsequent to the bending processing of the one pinch part 21.

Accordingly, the indicator part 21*a* can be easily manufactured without secondary processing. As a result, the indicator part 21*a* is further durable and attains its cost reduction compared with a structure requiring secondary processing.

Further, the indicator part 21*a* subjected to the bending processing does not deform even when the ground clip C is removed along with the attachment/detachment of the flexible hose B to/from the electroconductive pipe A. Therefore, an operator is enabled to identify the normal attachment direction of the ground clip C on a permanent basis and set the ground clip C in a correct direction over a long period of time.

In addition, the indicator part 21*a* preferably has the sharp point part 21*b* protruding in the axial direction of the coil part 1.

In this case, directivity in the axial direction of the coil part 1 becomes easily recognizable by the shape of the sharp point part 21*b* through its appearance, feels, or the like.

Accordingly, an operator is enabled to more easily identify the normal attachment direction of the ground clip C and set the ground clip C in a correct direction.

As a result, even an operator with a less operating experience is enabled to more reliably perform electrical connection between the electroconductive pipe A and the flexible hose B through the ground clip C.

Note that in the illustrated example of the embodiment described above, the one pinch part 21 having the indicator part 21*a* is disposed to be continuous with the one end part 11 of the coil part 1 facing the flexible hose B, while the other pinch part 22 is disposed to be continuous with the other end part 12 of the coil part 1 facing the electroconductive pipe A. However, the one pinch part 21 and the other pinch part 22 may be disposed oppositely.

That is, the one pinch part 21 and the indicator part 21*a* may be disposed to be continuous with the other end part 12 of the coil part 1 facing the electroconductive pipe A, while the other pinch part 22 that does not have the indicator part 21a may be disposed to be continuous with the one end part 11 of the coil part 1 facing the flexible hose B.

Even under such an opposite disposition setting, the same functions and effects as those of the illustrated example can be obtained.

REFERENCE SIGNS LIST

A Electroconductive pipe
A1 Outer face
B Flexible hose
C Ground clip
D Hose attachment structure
1 Coil part
11 End part (one end part)
12 End part (the other end part)
2 Pair of pinch parts
21 One pinch part
21a Indicator part
21b Sharp point part

The invention claimed is:

1. A hose attachment structure in which a ground clip is attached over a grounded electroconductive pipe and a flexible hose inserted onto an outer face of the electroconductive pipe, wherein
the ground clip includes a coil part that is attached to the outer face of the electroconductive pipe and an outer peripheral surface of the flexible hose and a pair of pinch parts that protrudes from both end parts in an axial direction of the coil part and faces each other, and
one pinch part among the pair of pinch parts has an asymmetrically-shaped indicator part having directivity in the axial direction of the coil part.

2. The hose attachment structure according to claim 1, wherein
the indicator part is formed by bending processing.

3. The hose attachment structure according to claim 2, wherein
the indicator part has a sharp point part protruding in the axial direction of the coil part.

4. The hose attachment structure according to claim 1, wherein
the indicator part has a sharp point part protruding in the axial direction of the coil part.

5. A ground clip attached over a grounded electroconductive pipe and a flexible hose inserted onto an outer face of the electroconductive pipe, the ground clip comprising:
a coil part that is attached to the outer face of the electroconductive pipe and an outer peripheral surface of the flexible hose; and
a pair of pinch parts that protrudes from both end parts in an axial direction of the coil part and faces each other, wherein
one pinch part among the pair of pinch parts has an asymmetrically-shaped indicator part having directivity in the axial direction of the coil part.

* * * * *